United States Patent [19]

Heide et al.

[11] Patent Number: 5,784,024

[45] Date of Patent: Jul. 21, 1998

[54] ARRANGEMENT FOR POSITION-SELECTIVE SPEED MEASUREMENT USING THE DOPPLER PRINCIPLE

[75] Inventors: Patric Heide; Richard Schubert, both of München; Rudolf Schwarte, Netphen; Valentin Mágori, München, all of Germany

[73] Assignee: Siemens Aktiengesellschaft, Munich, Germany

[21] Appl. No.: 750,480

[22] PCT Filed: Jun. 7, 1995

[86] PCT No.: PCT/DE95/00746

§ 371 Date: Dec. 10, 1996

§ 102(e) Date: Dec. 10, 1996

[87] PCT Pub. No.: WO95/34829

PCT Pub. Date: Dec. 21, 1995

[30] Foreign Application Priority Data

Jun. 10, 1994 [DE] Germany ............. 44 20 432.9

[51] Int. Cl.⁶ .................................................. G01S 13/08
[52] U.S. Cl. ........................ 342/104; 342/109; 342/375
[58] Field of Search ........................ 342/418, 104, 342/109, 375, 94

[56] References Cited

U.S. PATENT DOCUMENTS 2,676,317  4/1954  Purington .

3,764,963  10/1973  Beck et al. .
5,150,126  9/1992  Knepper et al. ............... 342/137

FOREIGN PATENT DOCUMENTS 2 573 215   5/1986   France .
1 466 036  12/1970   Germany .
13 03 869  11/1977   Germany .
28 23 419  12/1979   Germany .

OTHER PUBLICATIONS

Lange et al., Hochfrequenztechnische Anlagen, RF and microwave applications.

Primary Examiner—Theodore M. Blum
Attorney, Agent, or Firm—Hill, Steadman & Simpson

[57] ABSTRACT

When measuring speed over ground by means of microwave Doppler radar, signal noise, switching spikes and nearby reflectors reduce the measurement accuracy. In order to avoid these disadvantages, a reference signal which recurs with the period $T_0$ and a target signal which follows the reference signal after a time interval $T_s$ are emitted via an antenna. That part of the reference signal which has already been received again during transmission of the target signal is subtracted from the target signal which is received later. The difference signal obtained in this way is a measurement signal from which interference spikes, signal noise and nearby reflectors have been largely removed.

7 Claims, 2 Drawing Sheets

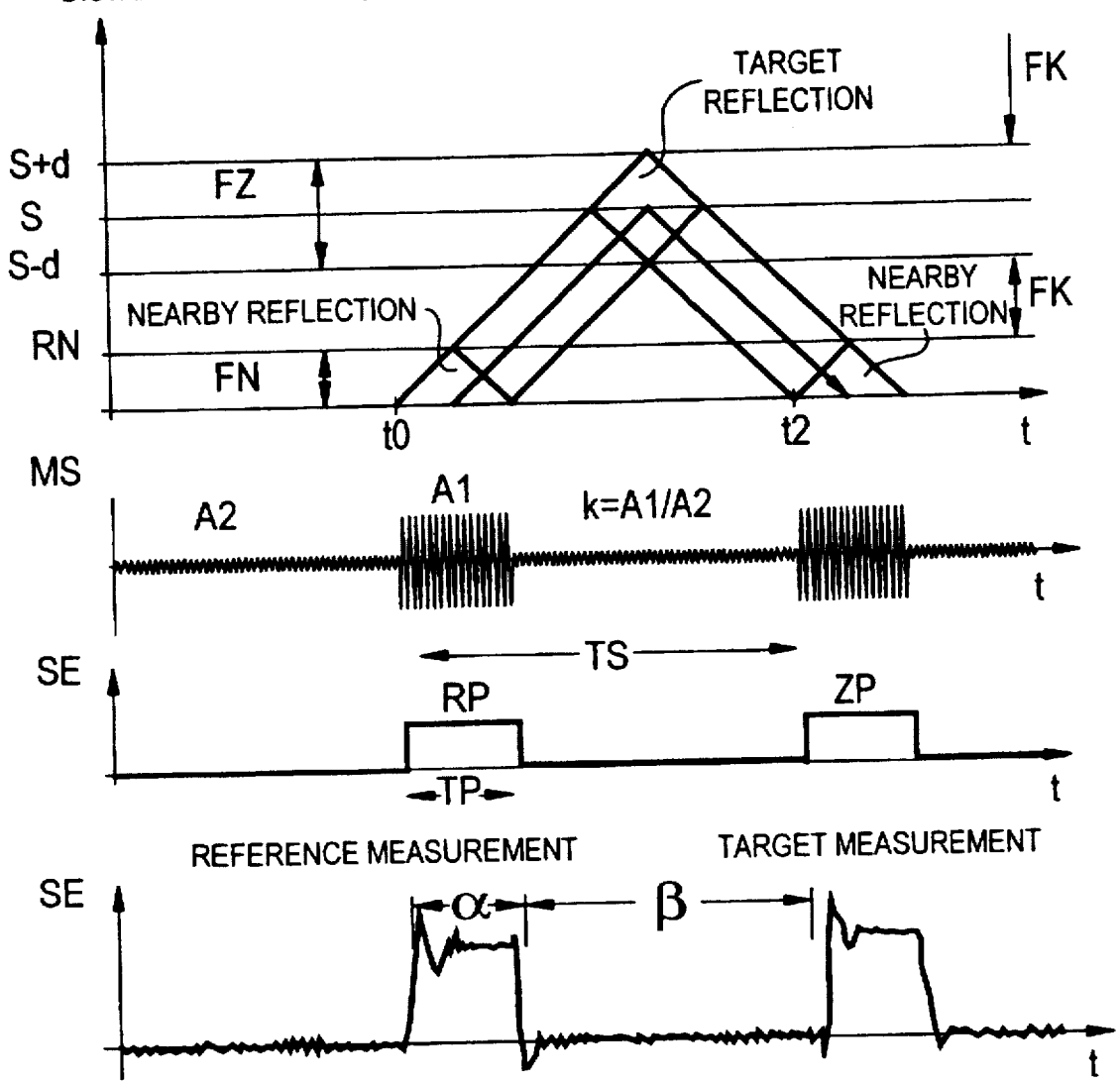
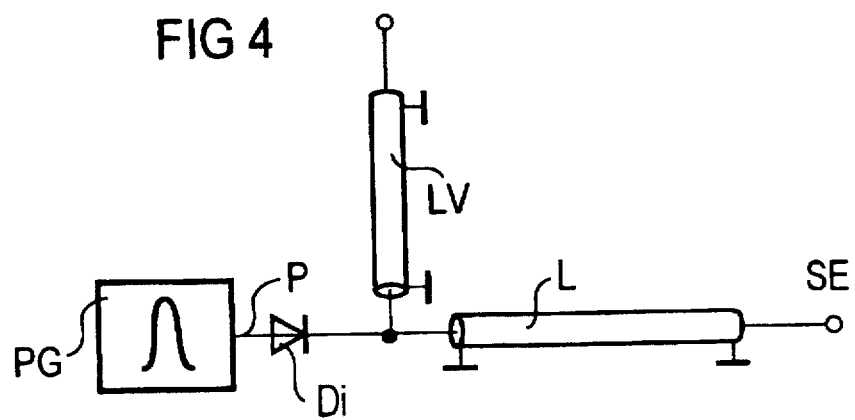

ARRANGEMENT FOR POSITION-SELECTIVE SPEED MEASUREMENT USING THE DOPPLER PRINCIPLE

BACKGROUND OF THE INVENTION

1. Field of the Invention

The present invention relates generally to an arrangement for position-selective speed measurement using the Doppler principle.

2. Description of the Related Art

Cost-effective microwave Doppler sensors are used to measure the speed over ground of land vehicles and vehicles on rails, and for movement detection in alarm systems. The sensitivity of these sensors is essentially limited by the noise behavior of the microwave generator.

In the case of Doppler sensors which operate using the continuous-wave (CW) mode, position-selective Doppler evaluation is also not possible.

In the Pulse-Doppler method, short microwave pulses are emitted which recur at a pulse repetition frequency PRF. The range selection in Pulse-Doppler sensors is governed by the time interval between the signals received from reflection objects at different ranges.

In the case of the Pulse-Doppler short-range sensor, fine position resolution is desirable, and a short pulse duration and thus a high transmission bandwidth are required for this purpose. The mean transmitted power and thus the sensitivity of the receiving stage as well are, however, reduced at the same time. This can be counter-acted by a greater transmitted pulse power or a higher pulse repetition frequency PRF, although this limits the maximum unambiguous range area, or by pulse integration, although this limits the maximum speed which can be measured unambiguously. Switching feedback effects in the pulse mode make it necessary to install expensive, direction-selective components such as isolators or separate transmitting and receiving antennas, for example, in the known pulsed sensors.

FIG. 1 shows the block diagram of a Pulse-Doppler sensor as is known from the "Taschenbuch der Hochfrequenztechnik" [Radio-frequency technology pocketbook], Chapter S1, Springer Press, 5th Edition, 1992. The microwave signal produced by the radio-frequency generator HFG—a microwave oscillator—is switched over with the aid of a microwave switch S having an amplitude-contrast ratio k:

$$k = \frac{A_1}{A_2} > 1$$

where:

$A_1$=amplitude during the switching state $\alpha$ $A_2$=amplitude during the switching state $\beta$ $\alpha$=switching state during which the microwave switch MWS is switched on $\beta$=switching state during which the microwave switch MWS is switched off between two switching states $\alpha$ and $\beta$, and is emitted via a transmitting/receiving antenna A. The transmitted field strength $\underline{E}_S$ and the received field strength $\underline{E}_R$ are superimposed between the radio-frequency generator HFG and the reflection object to form a standing wave. One cost-effective option for obtaining Doppler signals is homodyne detection by using a Schottky diode to detect the standing wave. The voltage $u_{Det}(t)$ at the demodulator DM, also called the detector, turns out, because of the square-law diode characteristic in the CW mode, to be:

$$u_{Det}(t) \equiv (\underline{E}_S + \underline{E}_R)^2 = E_S^2 = E_R^2 + 2E_S E_R \cos(\phi(t)) \approx E_S^2 + 2E_S E_R \cos(\phi(t))$$

where:

$E_S$=transmitted field strength $E_R$=received field strength $2E_S E_R \cos(\phi(t))$=wanted signal (Doppler signal)

$E_R \ll E_S$ $\phi(t)$=phase shift between the transmitted field strength $E_S$ and the received field strength $E_R$.

Because of the noise from the radio-frequency generator HFG, the term $E_S^2$ which corresponds to the rectified element of the oscillator signal is not constant. The reception sensitivity is determined by the ratio of the fluctuation width of the term $E_S^2$ to the amplitude of the Doppler signal. In contrast to the CW mode, a Doppler signal is present at the demodulator DM in the pulse mode (in the ideal case the amplitude-contrast ratio k is much greater than 1) only in the switching state $\alpha$, $\alpha$ designating the pass mode, and can be sampled at the demodulator DM, the measurement of the Doppler signal being repeated at a repetition frequency PRF by repeatedly switching over between the states $\alpha$ and $\beta$. A position-selective, continuous-time Doppler signal can be reconstructed from the sample pulses by interpolation of all the samples from the Doppler signal, for example with the aid of a sample and hold element AH. One disadvantage of this method is that the samples are adversely affected by switching spikes and oscillator noise and, because of the finite amplitude-contrast ratio k<∞, also contain a signal element from undesired range areas. In the past, these disadvantages have been only partially overcome using microwave switches with high switching contrast, direction-selective elements such as isolators and circulators, or separate transmitting/receiving antennas. These measures considerably increase the costs and circuit complexity.

SUMMARY OF THE INVENTION

An object of the present invention is to provide an arrangement for position-selective speed measurement, in which interference in the form of signal noise, switching spikes and signals from undesirable range areas or nearby reflectors is reduced to a major extent, and the measurement accuracy can thus be increased.

This and other objects and advantages of the invention are achieved by an arrangement for position-selective speed measurement using the Doppler principle in which a means is provided for producing a pulse sequence which has a reference pulse and a target pulse, in which a periodic signal, which is produced by a radio-frequency generator, is applied to an antenna using a means for switching as a function of the pulse sequence, in which the signals, which are demodulated by a demodulator which is connected to the radio-frequency generator and to the means for switching, are applied to a means for signal sampling and to a means for subtraction which forms the difference between the signals which are demodulated during the occurrence of the reference pulse and of the target pulse, and in which the target pulse is applied after the time interval to the control input of the means for switching, after which the periodic signal which is emitted during the occurrence of the reference pulse can be received again.

A simple design is possible for producing the switching signal (pulse sequence).

BRIEF DESCRIPTION OF THE DRAWINGS

The invention will be explained in more detail with reference to the figures.

FIG. 3 shows a series of graphs with a Minkowski diagram, which corresponds to the speed measurement arrangement, and associated typical signal waveforms.

FIG. 4 shows a circuit diagram of an alternative arrangement for producing a pulse sequence.

DETAILED DESCRIPTION OF THE PREFERRED EMBODIMENTS

Figure 1:
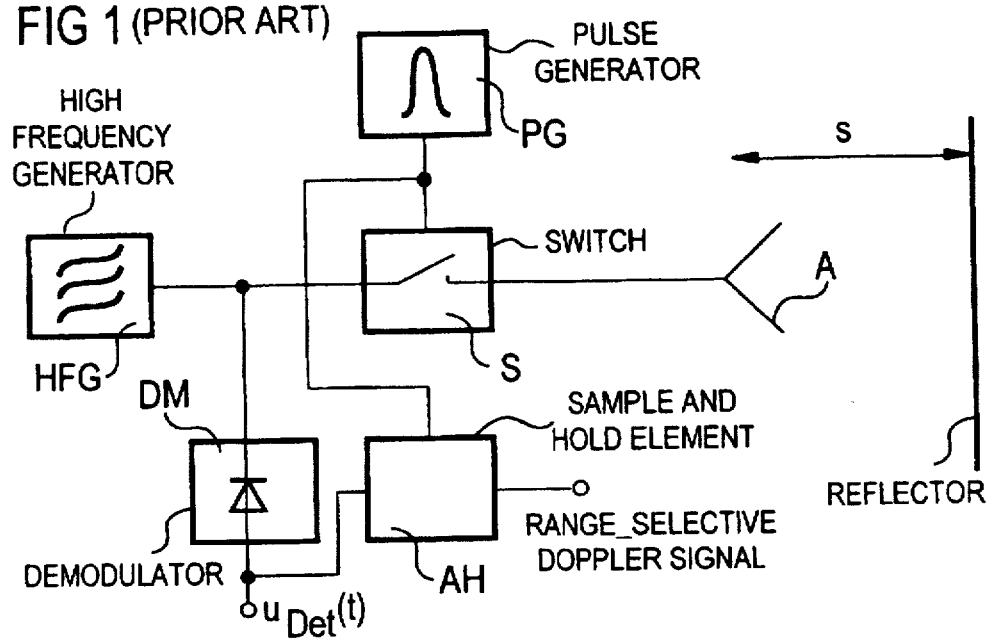
FIG. 1 shows a schematic view of an arrangement for position-selective speed measurement as is known from the publication Taschenbuch der Hochfrequenztechnik [Radio-frequency technology pocketbook], Chapter S1, Springer Press, 5th Edition 1992.
Figure 2:
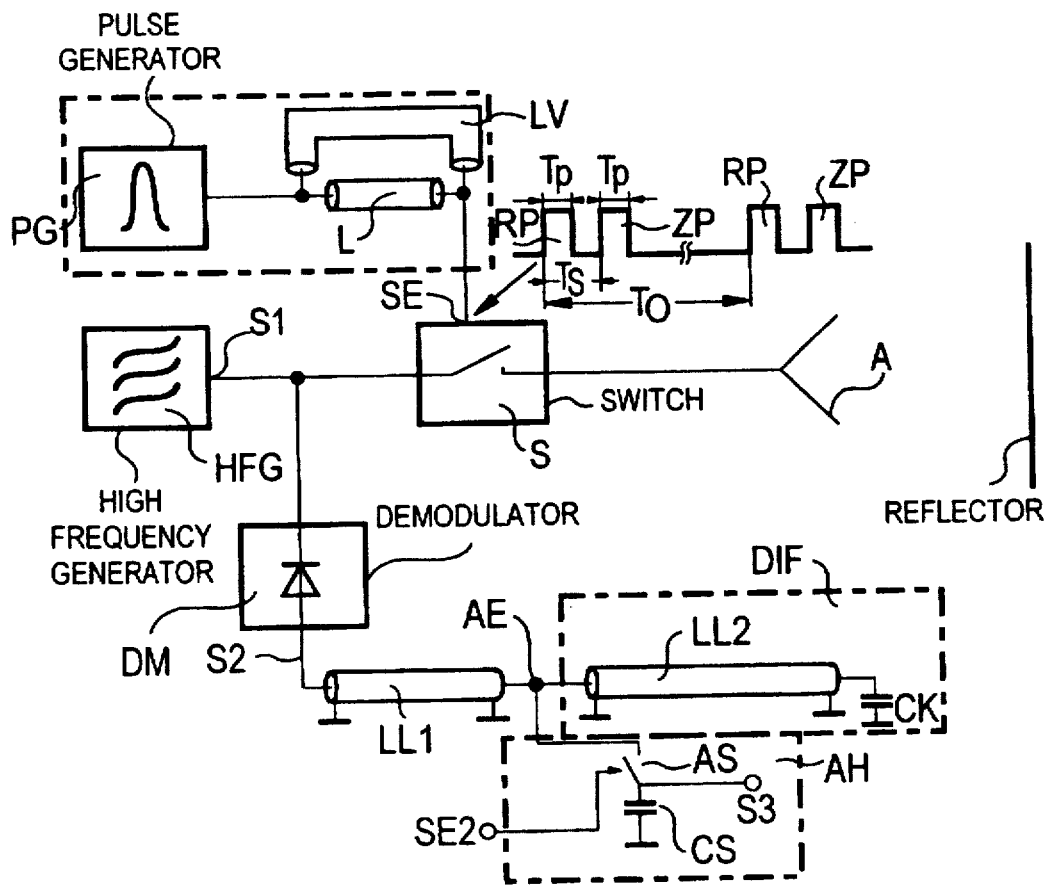
FIG. 2 shows a schematic view of arrangement according to the invention for position-selective speed measurement.

The pulse generator PG which is illustrated in FIG. 2 produces a first pulse which recurs with the period $T_0$ and is called the reference pulse RP, in the following text. This reference pulse signal passes via two lines L and LV, of different lengths, to the control input SE of the switching element S. That part of the reference pulse signal which takes the longer path, via the delay element LV passes, delayed by the time interval $T_s$ with respect to the signal element of the reference pulse RP which is routed via the shorter line L, to the control input SE of the switching element S. A reference pulse RP, which recurs with the period $T_0$ and a pulse, called the target pulse ZP, which likewise recurs with the period $T_0$ and is shifted by the pulse interval $T_s$ with respect to the reference pulse RP are thus applied to the control input SE of the switching element S.

When one of the two pulses RP or ZP is applied to the control input SE of the switching element S, then a microwave signal MS is switched through to the antenna A for the pulse duration $T_p$, which microwave signal MS corresponds, for this period, to the radio-frequency signal S1 produced by the radio-frequency generator HFG. The microwave signal MS which is emitted from the antenna A is the pulse-modulated signal from the radio-frequency signal S1 and from the reference pulse RP, or the pulse-modulated signal from the radio-frequency signal S1 and from the target pulse ZP, or a residual signal which does not decay to zero because of the finite switching contrast of the switching element S. Since the switching element S is switched on, the received signal (an echo) also passes through the demodulator DM at the same time so that a Doppler signal S2 is produced there, which can be sampled. The pulse interval $T_s$ is set such that the echo of the radio-frequency signal S1 which is emitted while the reference pulse RP is present and is reflected from the range $s=c \cdot T_s/2$ arrives at the same time as the target pulse ZP occurs, and passes to the demodulator DM. While the target pulse ZP is present at the control input SE of the switching element S, a radio-frequency signal S1 which is modulated with the target pulse ZP is emitted once again. The second demodulated signal S2 ($t_2$) which is present at the output of the demodulator DM during the occurrence of the target pulse ZP at the time $t_2$, contains in addition to all the interference signals the information about the reflector or backscattering elements, while the first demodulated signal S2 ($t_0$), which is present at the time $t_0$ of occurrence of the reference pulse RP at the demodulator output, contains only the interference elements. The comparison (the subtraction) of the two demodulated signals S2 ($t_0$) and S2 ($t_2$) produces a signal S3 from which the interference has been removed and which contains only the information about the reflector or reflecting object. In this case, both the generator noise as well as in the instances of switching feedback effects and of the nearby reflectors and reflections from undesired range areas are eliminated because of the finite switching contrast $k<\infty$. This results in a considerable increase in sensitivity and in the intended increase in position selectivity.

The measurement process is repeated with a period $T_0$. In this case, $T_0$ is selected to be sufficiently long that the measurements (target, reference) run independently of one another, that is to say there are no longer any received signals from the preceding measurement process in each new measurement.

The reflections of the transmitted signals can be illustrated in the position/time domain using the Minkowski diagram shown in FIG. 3. Time is plotted on the abscissa, and position on the ordinate. The ordinate is broken down into three areas, the close-range area FN, the target area FZ and the long-range area FK, the close-range area FN and the target area FZ being important for operation. At the time to at which the reference pulse RP is applied to the control input SE of the switching element S, the switching element S, also called a microwave switch, is switched on for the time for which the reference pulse RP occurs, which corresponds to the switching state α. The continuous radio-frequency signal S1 produced by the radio-frequency generator HFG is applied to the antenna A, modulated with the reference pulse RP, and is emitted for the time during which the switching element S is switched on. At the time $t_2$ at which the target pulse ZP is applied to the control input SE of the switching element S, the radio-frequency signal S1 is modulated with the target pulse ZP and is applied to the antenna A for the pulse duration $T_p$ and is emitted. During this pulse duration $T_p$, the signal which was emitted at the time to and was subsequently reflected is at the same time received at the antenna A.

The signal elements S2 ($t_0$) and S2 ($t_2$) which contain the signal S2, present at the demodulator output, at the time $t=t_0$, $t=t_2$ are shown in the following table:

| Signal/time | t = t0 | t = t2 |
| --- | --- | --- |
| Short-range reflection | X | X |
| Switching peaks | X | X |
| Oscillator noise | X | X |
| CW element (because $k < \infty$) | X | X |
| Target reflection |   | X |

The difference between the two signal elements is a signal S3 from which all interference has been removed.

Sampling of the signal which is supplied from the demodulator, with simultaneous subtraction, is carried out by a special sample and hold element AH with a subtraction element DIF.

The demodulated signal S2, comprising the pulse sequence S2 ($t_0$) and S2 ($t_2$) is connected via a line LL1 to a sampling switch AS and is passed to the memory capacitance CS when the signal S2 ($t_2$) is present at the point AE. The length of the line LL2, which is short-circuited at the end, is selected such that the inverse signal element S2 ($t_0$) is also present at the same time at the point AE at the time at which the signal element S2 ($t_2$) is present at the point AE, so that, overall, the difference is passed through to the memory capacitance CS. The voltage inversion is carried out by a radio-frequency short-circuit by a capacitance CK at the end of the line LL2. Passing the signal at the point AE through to the memory capacitance CS is initiated by a control pulse SE2, which can be derived from the pulse generator PG.

One alternative arrangement for producing the pulse sequence may appear as is shown in FIG. 4. A positive pulse P produced by the pulse generator PG is passed through the diode Di and is split between the two lines LV and L. That element of the pulse P which has passed into the line LV is reflected at the open-circuit end of line LV with +1 and passes, delayed by the pulse interval $T_s$ with respect to the other element, to the control input SE of the switching element S. The reference pulse RP thus corresponds to that element of the pulse P which is passed only through the line L while, in contrast, the target pulse ZP corresponds to that element of the pulse P which is passed through both the line LV and the line L.

The switching element S can be replaced by an element for amplitude modulation. The pulse sequence is not limited only to pulses. Any signal waveforms can be used which are suitable for modulation of the radio-frequency signal S1.

Although other modifications and changes may be suggested by those skilled in the art, it is the intention of the inventor to embody within the patent warranted hereon all changes and modifications as reasonably and properly come within the scope of his contribution to the art.

I claim:

1. An arrangement for position-selective speed measurement using the Doppler principle, comprising:

a means for producing a pulse sequence which has a reference pulse and a target pulse, a radio-frequency generator, a means for switching said periodic signal as a function of the pulse sequence, a demodulator which is connected to the radio-frequency generator and to the means for switching, a means for signal sampling a means for subtraction for forming a difference between the demodulated signals which are demodulated during occurrence of the reference pulse and of the target pulse, and the target pulse after a time interval to the control input of the means for switching, after which the periodic signal which is emitted during occurrence of the reference pulse can be received again.

2. An arrangement as claimed in claim 1, wherein the means for producing the pulse sequence includes a pulse generator for producing the reference pulse, and a delay element for producing the target pulse.

3. An arrangement as claimed in claim 2, wherein the delay element includes a delay line which is connected in parallel with a line, the delay line is longer than the line by a length which corresponds to the time interval.

4. An arrangement as claimed in claim 2, wherein the delay element includes a delay line which has an open circuit at one of its ends and is connected to a diode and to a line at its other end, and the diode is connected to the pulse generator.

5. An arrangement as claimed in claim 1, wherein, the means for subtraction includes a memory in which the demodulated signal is stored until a next demodulated signal is available.

6. An arrangement as claimed in claim 5, wherein the memory of the means for subtraction has a short-circuited conductor at whose end inversion of the demodulated signal takes place, a length of the short-circuited conductor corresponds to the time interval.

7. An arrangement as claimed in claim 1, wherein the means for switching is a means for amplitude modulation.

* * * * *